(12) United States Patent
Murray et al.

(10) Patent No.: US 8,014,822 B1
(45) Date of Patent: Sep. 6, 2011

(54) ACCESSORIZED CELLPHONE APPARATUS

(76) Inventors: Ralph M. Murray, Jamaica, NY (US); Rodrigo Padinha, Jamaica, NY (US)

( * ) Notice: Subject to any disclaimer, the term of this patent is extended or adjusted under 35 U.S.C. 154(b) by 390 days.

(21) Appl. No.: 12/417,312

(22) Filed: Apr. 2, 2009

(51) Int. Cl.
*H04M 1/00* (2006.01)

(52) U.S. Cl. ..................... 455/556.1; 455/66.1

(58) Field of Classification Search ............... 455/556.1, 455/66.1
See application file for complete search history.

(56) References Cited

U.S. PATENT DOCUMENTS

| | | | |
|---|---|---|---|
| D175,315 S | 8/1955 | Quandt et al. | |
| 3,729,288 A * | 4/1973 | Berlincourt et al. | 431/264 |
| 4,515,556 A | 5/1985 | Vanelli | |
| 4,816,971 A | 3/1989 | Chin | |
| 6,341,871 B1 | 1/2002 | Angelopoulos | |
| 6,858,182 B1 | 2/2005 | Ito et al. | |
| D503,698 S | 4/2005 | Aihara | |
| 6,979,093 B2 | 12/2005 | Tsay | |
| D526,638 S | 8/2006 | Farkas | |
| 7,086,748 B1 * | 8/2006 | Elembaby | 362/88 |
| D555,588 S | 11/2007 | Yuen | |
| 7,373,183 B2 * | 5/2008 | Brudos | 455/572 |
| 7,494,239 B2 * | 2/2009 | Riccardi | 362/109 |
| 2005/0218137 A1 * | 10/2005 | Sela et al. | 219/262 |

* cited by examiner

*Primary Examiner* — James H Cho
(74) *Attorney, Agent, or Firm* — Crossley Patent Law; Mark A. Crossley

(57) ABSTRACT

The accessorized cellphone apparatus combines three typically separate devices into one. The cellphone device of the apparatus features a cellphone view window with accompanying keypad located proximally below. The top of the apparatus, which optionally includes an antenna, also features an activation button for operating the heating element, disposed in the combustion chamber within the top of the apparatus. The combustion chamber houses the piezoelectric igniter. The heating element maintains gas ignition within the combustion chamber such that inclement conditions do not extinguish the flame. The LED lighted flashlight is disposed within the bottom of the apparatus and features a reflector grid implanted with a plurality of LED's, offering maximal lighting with low voltage power of the cellphone battery.

2 Claims, 4 Drawing Sheets

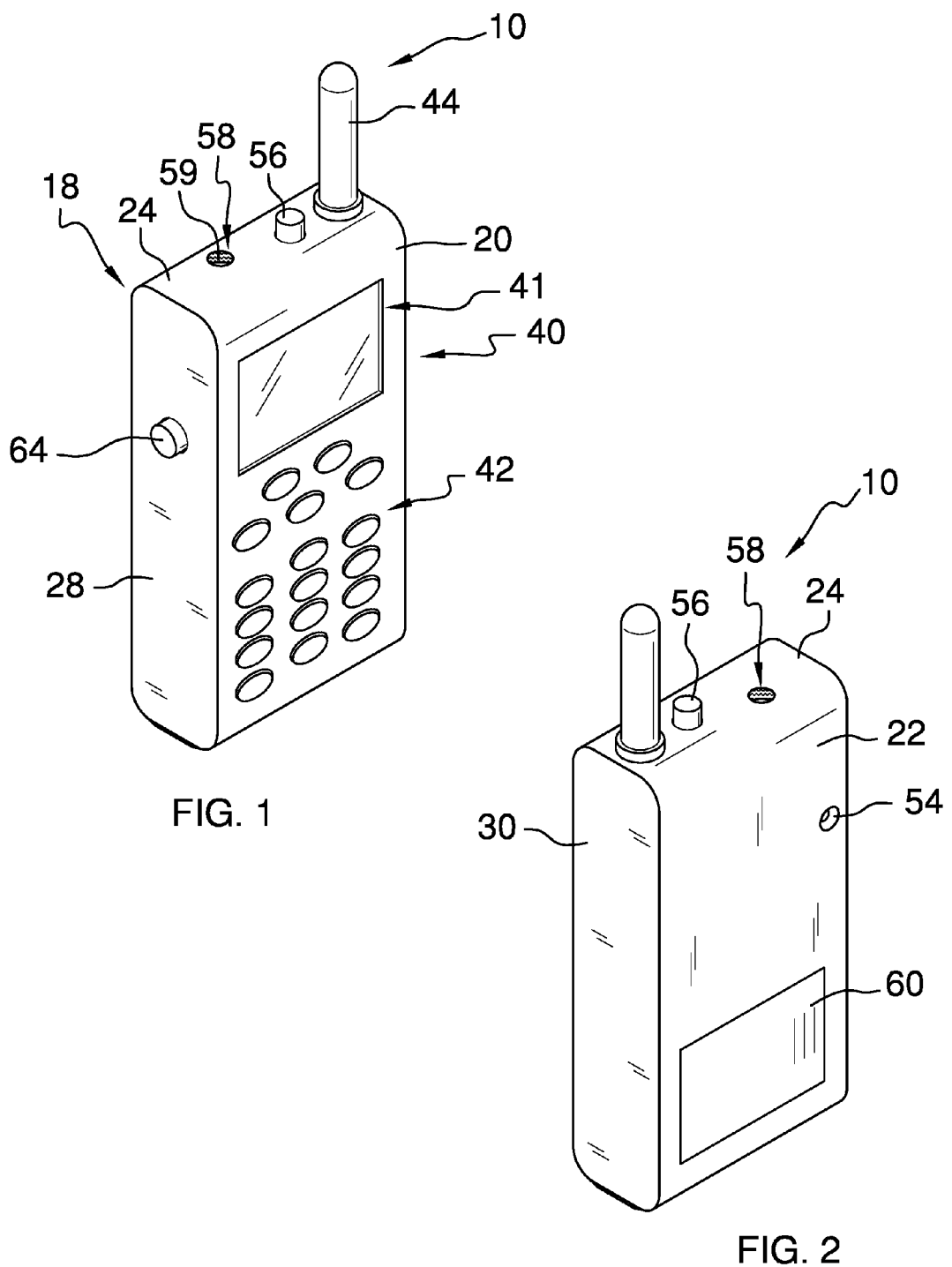

ACCESSORIZED CELLPHONE APPARATUS

BACKGROUND OF THE INVENTION

In the past, cigarette lighters and flashlights have been occasionally packaged together. Additionally, a cellphone with a flashlight is not a new idea. However, the present apparatus includes a cellphone with cigarette lighter and a flashlight, all carefully packaged to be included in a typical cellphone size and appearance.

FIELD OF THE INVENTION

The accessorized cellphone apparatus relates to cellphones and more especially to an apparatus that includes a cellphone, a flashlight, and a cigarette lighter.

SUMMARY OF THE INVENTION

The general purpose of the accessorized cellphone apparatus, described subsequently in greater detail, is to provide a accessorized cellphone apparatus which has many novel features that result in an improved accessorized cellphone apparatus which is not anticipated, rendered obvious, suggested, or even implied by prior art, either alone or in combination thereof.

To attain this, the accessorized cellphone apparatus has been carefully designed and engineered to combine three typically separate devices into one. The cellphone component of the apparatus features a cellphone view window with accompanying keypad located proximally below. This ergonomic arrangement within the hexahedron front most approximates a design featured in a majority of cellphones. The top of the apparatus, which optionally includes an antenna, also features an activation button for operating the heating element, disposed in the combustion chamber within the top of the apparatus. The combustion chamber houses the piezoelectric igniter. The heating element maintains gas ignition within the combustion chamber so that inclement conditions do not extinguish the flame. The LED lighted flashlight is disposed within the bottom of the apparatus and features a reflector grid implanted with a plurality of LED's, offering maximal lighting with low voltage power of the cellphone battery. While both the lighter and the flashlight are conveniences, the flashlight is also useful in emergencies and in finding essentials in dark conditions, without having to search for a flashlight or lighter separately.

The operation of the flashlight does not require searching for a switch, as the light switch is the only function on the first side of the apparatus. Operation of the cigarette lighter, likewise, does not require a search or caution in operation, as the activation button is disposed on the apparatus top, immediately next to the antenna, and away from the combustion chamber to avoid user burns.

Thus has been broadly outlined the more important features of the improved accessorized cellphone apparatus so that the detailed description thereof that follows may be better understood and in order that the present contribution to the art may be better appreciated.

An object of the accessorized cellphone apparatus is to strategically combine a cellphone, a cigarette lighter, and a flashlight.

Another object of the accessorized cellphone apparatus is to provide ergonomically disposed controls of the three devices so that searching for operation is unnecessary.

A further object of the accessorized cellphone apparatus is to provide a windproof lighter.

An added object of the accessorized cellphone apparatus is to locate the lighter activation button away from the combustion chamber to avoid user burns.

And, an object of the accessorized cellphone apparatus is to provide a bright flashlight that operates on minimal voltage.

These together with additional objects, features and advantages of the improved accessorized cellphone apparatus will be readily apparent to those of ordinary skill in the art upon reading the following detailed description of presently preferred, but nonetheless illustrative, embodiments of the improved accessorized cellphone apparatus when taken in conjunction with the accompanying drawings.

In this respect, before explaining the current embodiments of the improved accessorized cellphone apparatus in detail, it is to be understood that the accessorized cellphone apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved accessorized cellphone apparatus. It is therefore important that the claims be regarded as including such equivalent constructions insofar as they do not depart from the spirit and scope of the accessorized cellphone apparatus. It is also to be understood that the phraseology and terminology employed herein are for purposes of description and should not be regarded as limiting.

BRIEF DESCRIPTION OF THE DRAWINGS

FIG. 1 is a perspective frontal view.
FIG. 2 is a perspective back view.

DETAILED DESCRIPTION OF THE DRAWINGS

Figure 3:
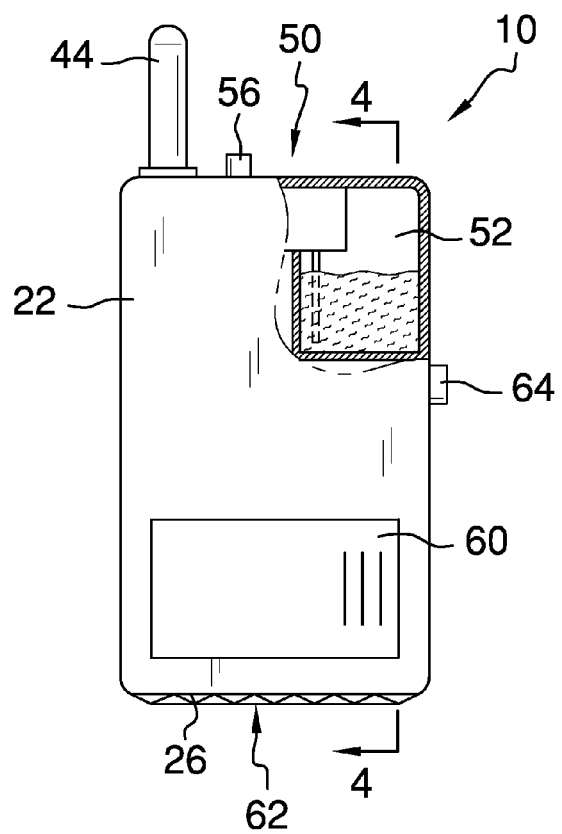
FIG. 3 is a partial cross sectional back elevation view.

With reference now to the drawings, and in particular FIGS. 1 through 7 thereof, the principles and concepts of the accessorized cellphone apparatus generally designated by the reference number 10 will be described.

Referring to FIGS. 1 and 2, the apparatus 10 comprises a hexahedron 18 having a front 20 spaced apart from a back 22, a top 24 spaced apart from a bottom 26, and a first side 28 spaced apart from a second side 30. A cellphone 40 is disposed within the hexahedron 18. The view window 41 of the cellphone 40 is disposed within the hexahedron 18 front 20 proximal to the top 24. The keypad 42 of the cellphone 40 is disposed within the hexahedron 18 front 20, below the view window 41. The optional cellphone antenna 44 is disposed in the top 24 adjacent to the second side 30. The hexahedron 18 further comprises the lighter 50. The lighter 50 comprises the combustion chamber 58, the heating element 59, the igniter (not shown), the reservoir 52, the fill valve 54, and the activation button 56. The combustion chamber 58 is disposed within the hexahedron 18 top 24. The combustion chamber 58 is most proximal to the first side 28.

The heating element 59 is disposed within the combustion chamber 58. The piezoelectric igniter (not shown) is in communication with the combustion chamber 58. Piezoelectric igniters are well known in the art.

Figure 4:
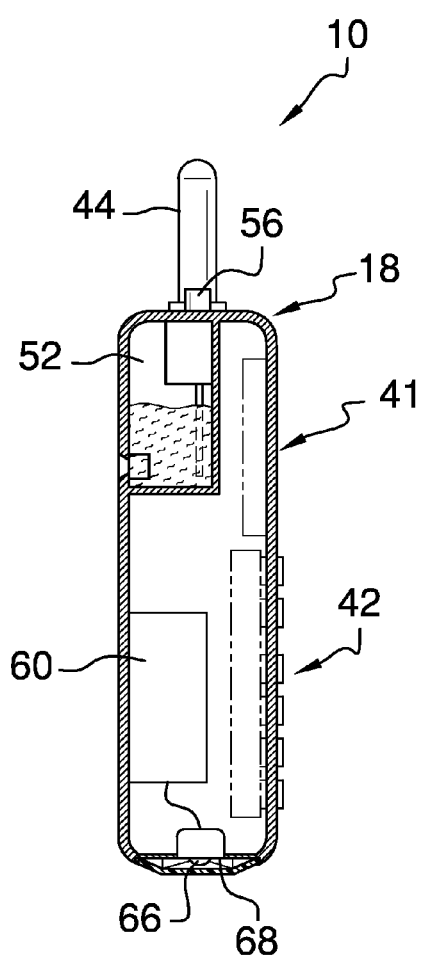
FIG. 4 is a cross sectional side elevation view.

Referring to FIGS. 3 and 4, the reservoir 52 is in communication with the igniter and the combustion chamber 58. The reservoir 52 is disposed within the hexahedron 18 back 22 adjacent to the top 24 first side 28. The reservoir 52 is disposed partly behind the view window 41 of the cellphone 40. The fill valve 54 is disposed within the back 22 proximal to the first side 28. Flammable material stored in the reservoir may be butane, propane, or other appropriate material. The fill valve 54 is in communication with the reservoir 52. The activation button 56 is disposed within the top 24 most proximal to the second side 30. The activation button 56 ignites the igniter. The activation button 56 heats the heating element 59. The activation button 56 maintains the heating element 59 in a heated condition with continued depression. Release of the activation button 56 turns off reservoir 52 supply of flammable material to the combustion chamber 58. Release of the activation button 56 also turns off power to the heating element 59.

Figure 6:
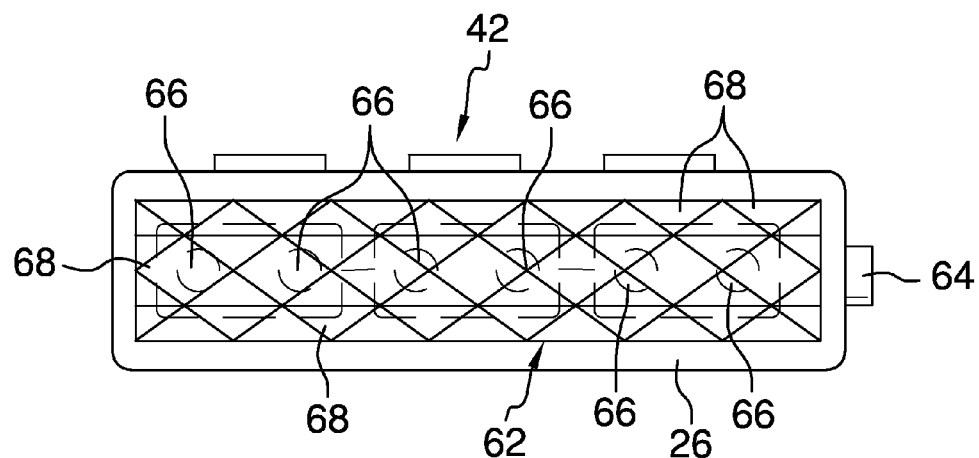
FIG. 6 is a bottom plan view.
Figure 7:
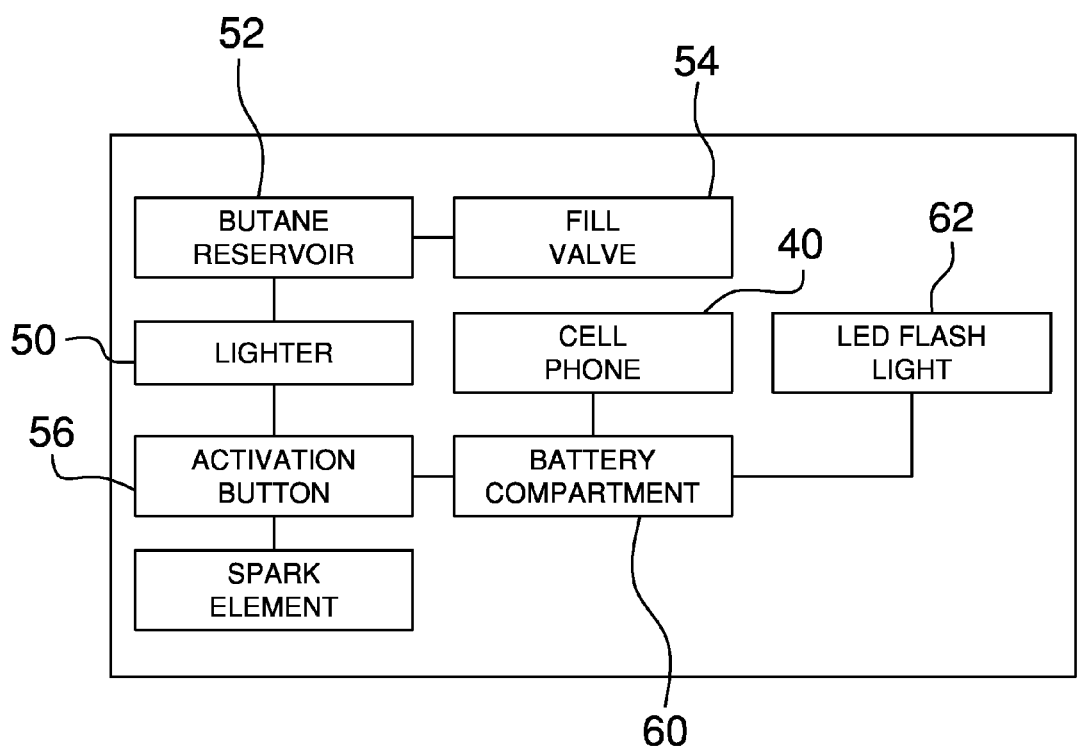
FIG. 7 is a schematic block diagram of the relationship of the three devices of the apparatus.

Referring again to FIGS. 3 and 4 and also to FIG. 6, the flashlight 62 is extended from the hexahedron 18 bottom 26. The flashlight 62 partially comprises the reflector grid 68 that has a size substantially equal to a size of the hexahedron 18 bottom 26. The plurality of LED's (light emitting diodes) 66 is disposed within the reflector grid 68. The combination of the numerous LED's 66 and the reflector grid 68 provide a bright light with only the minimal voltage supplied by the cellphone 40 battery. The light switch 64 is disposed within the hexahedron 18 first side 28. The light switch 64 is disposed immediately below the reservoir 52. The light switch 64 operates the flashlight 62. The battery compartment 60 is disposed within the back 22 proximal to the bottom 26. The battery compartment 60 is in communication with the heating element 59, the cellphone 40, and the light switch 64.

Figure 5:
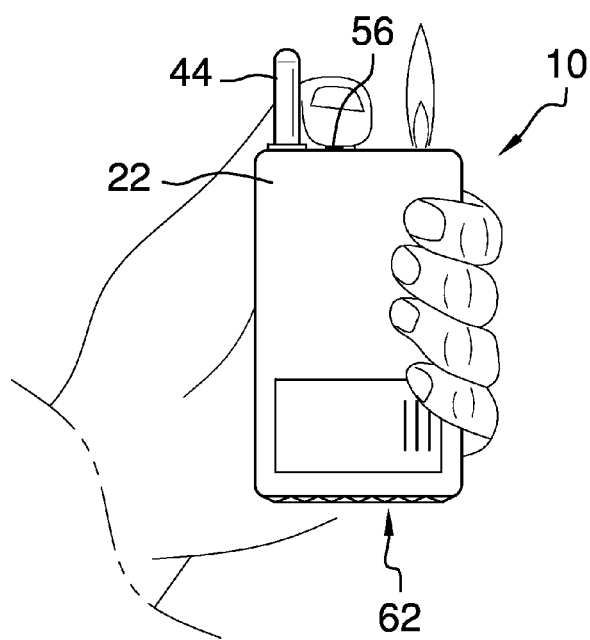
FIG. 5 is a back elevation view with lighter operated.

Referring to FIG. 5, as noted, continued depression of the activation button 56 continues gas flow from the reservoir 52 to the combustion chamber and also maintains the heating element 59 in the heated state, thereby ensuring maintenance of flame, even in inclement conditions.

With respect to the above description then, it is to be realized that the optimum dimensional relationships for the parts of the accessorized cellphone apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the accessorized cellphone apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the accessorized cellphone apparatus may be used.

Therefore, the foregoing is considered as illustrative only of the principles of the accessorized cellphone apparatus. Further, since numerous modifications and changes will readily occur to those skilled in the art, it is not desired to limit the accessorized cellphone apparatus to the exact construction and operation shown and described, and accordingly, all suitable modifications and equivalents may be resorted to, falling within the scope of the accessorized cellphone apparatus.

What is claimed is:

1. An accessorized cellphone apparatus, comprising, in combination:
    a hexahedron having a front spaced apart from a back, a top spaced apart from a bottom, a first side spaced apart from a second side;
    a cellphone disposed within the hexahedron;
    a view window of the cellphone disposed within the hexahedron front proximal to the top;
    a keypad of the cellphone disposed within the hexahedron front, below the view window;
    a lighter disposed within the hexahedron, the lighter comprising:
        a combustion chamber disposed within the hexahedron;
        a heating element disposed within the combustion chamber;
        a piezoelectric igniter in communication with the combustion chamber;
        a reservoir of a flammable material in communication with the igniter and the combustion chamber;
        a fill valve disposed within the hexahedron, the fill valve in communication with the reservoir;
        an activation button disposed within the hexahedron, the activation button providing flow of the flammable material from the reservoir, the activation button igniting the igniter, the activation button heating the heating element, the activation button maintaining the heating element in a heated condition and flow of the flammable material with continued depression;
    a flashlight extended from the hexahedron bottom, the flashlight further comprising:
        a reflector grid;
        a plurality of LED's disposed within the reflector grid;
        a light switch disposed within the hexahedron, the light switch operating the flashlight;
    a battery compartment disposed within the hexahedron back, the battery compartment in communication with the heating element, the cellphone, and the light switch.

2. An accessorized cellphone apparatus, comprising, in combination:
    a hexahedron having a front spaced apart from a back, a top spaced apart from a bottom, a first side spaced apart from a second side;
    a cellphone disposed within the hexahedron;
    a view window of the cellphone disposed within the hexahedron front proximal to the top;
    a keypad of the cellphone disposed within the hexahedron front, below the view window;
    a combustion chamber disposed within the hexahedron top, the combustion chamber most proximal to the first side;
    a heating element disposed within the combustion chamber;
    a piezoelectric igniter in communication with the combustion chamber;
    a reservoir of flammable material in communication with the igniter and the combustion chamber, the reservoir disposed within the hexahedron back adjacent to the top first side, the reservoir disposed partly behind the view window of the cellphone;
    a fill valve disposed within the hexahedron back proximal to the first side, the fill valve in communication with the reservoir;
    an activation button disposed within the hexahedron top most proximal to the second side, the activation button providing flow of the flammable material, the activation button igniting the igniter, the activation button heating the heating element, the activation button maintaining the heating element in a heated condition and flow of the flammable material with continued compression;

a flashlight extended from the hexahedron bottom, the flashlight further comprising:

a reflector grid having a size substantially equal to a size of the hexahedron bottom;

a plurality of LED's disposed within the reflector grid;

a light switch disposed within the hexahedron first side, the light switch disposed immediately below the reservoir, the light switch operating the flashlight;

a battery compartment disposed within the hexahedron back proximal to the bottom, the battery compartment in communication with the heating element, the cellphone, and the light switch.

\* \* \* \* \*